United States Patent
Mycynek et al.

(10) Patent No.: US 6,377,316 B1
(45) Date of Patent: Apr. 23, 2002

(54) TUNER WITH SWITCHED ANALOG AND DIGITAL MODULATORS

(75) Inventors: Victor G. Mycynek, Des Plaines; David S. Tait, Wood Dale, both of IL (US)

(73) Assignee: Zenith Electronics Corporation, Lincolnshire, IL (US)

( * ) Notice: Subject to any disclaimer, the term of this patent is extended or adjusted under 35 U.S.C. 154(b) by 0 days.

(21) Appl. No.: 09/152,399

(22) Filed: Sep. 14, 1998

Related U.S. Application Data

(63) Continuation-in-part of application No. 09/027,688, filed on Feb. 23, 1998.

(51) Int. Cl.[7] .......................... H04N 5/44; H04N 5/268; H04N 5/52
(52) U.S. Cl. .................. 348/731; 348/725; 348/678; 348/705; 348/733; 348/638; 348/639
(58) Field of Search .............................. 348/725, 726, 348/731, 735, 678, 638, 639, 705, 706, 732, 733, 10, 730; 455/553, 245.1, 246.1, 247.1, 337, 214; H04N 5/44, 5/50, 5/268, 9/66, 5/52

(56) References Cited

U.S. PATENT DOCUMENTS

| | | | | |
|---|---|---|---|---|
| 4,481,429 A | * | 11/1984 | Christopher | 307/296 |
| 5,418,815 A | * | 5/1995 | Ishikawa et al. | 375/216 |
| 5,638,112 A | * | 6/1997 | Bestler et al. | 348/10 |
| 5,774,195 A | * | 6/1998 | Miyahara et al. | 348/726 |
| 5,825,833 A | * | 10/1998 | Sakue | 375/344 |
| 5,956,098 A | * | 9/1999 | Mizukami et al. | 348/735 |
| 6,005,640 A | * | 12/1999 | Strolle et al. | 348/726 |
| 6,014,178 A | * | 1/2000 | Jeon et al. | 348/554 |
| 6,016,170 A | * | 1/2000 | Takayama et al. | 348/731 |

\* cited by examiner

*Primary Examiner*—Andrew Faile
*Assistant Examiner*—Paulos Natnael

(57) ABSTRACT

A television receiver includes a tuner for receiving either analog or digital signals. Separate analog and digital demodulators are selectively coupled to the tuner through an RF switch that is controlled by the signal from a sync detector in the output of the analog demodulator. The selected one of the demodulators develops an AGC signal that is coupled to the tuner through a current mirror. Operating potential for the demodulators is coupled through the RF switch so that the oscillator in the non-selected demodulator is disabled and precluded from interfering with the oscillator in the enabled demodulator.

9 Claims, 2 Drawing Sheets

TUNER WITH SWITCHED ANALOG AND DIGITAL MODULATORS

This application is a Continuation-In-part of application Ser. No. 09/027,688, filed Feb. 23, 1998.

BACKGROUND OF THE INVENTION AND PRIOR ART

This invention relates generally to television receivers and specifically to television receivers that are capable of receiving both analog and digital signals.

The recently adopted standards for advanced television broadcasting envision the coexistence of both analog and digital television signals for a number of years. It would therefore be desirable for a single television receiver to have the capability of receiving both analog and digital signals. A solution would be to employ separate "front ends" in the television receiver, one for analog signals and one for digital signals. Such a receiver would minimally require two tuners and two IF demodulators and would not be cost-effective. The solution of the invention uses one tuner and switches the IF and AGC signals between the single tuner and separate demodulators. It should be noted that the terms RF and IF are used interchangeably in the specification and the claims and the particular frequencies are not to be considered limiting of the invention. It is also recognized that many personal computer manufacturers are including (or contemplate including) additional circuitry in their computers to enable the computer to function as a television receiver. Accordingly, the invention should not be considered as limited to television receivers.

A potential solution to the above problem is to incorporate an RF splitter between the tuner and the demodulators to permit supplying both demodulators with the IF signal. The signal loss in the splitter would, however, appear to seriously degrade the receiver noise performance. Another potential solution is to amplify the IF signal before splitting it. This technique could seriously degrade the distortion characteristics of the digital receiver in the presence of strong adjacent channel analog signals.

The invention in both the present and prior applications is directed to a low cost switching system for supplying the IF output from a single tuner to separate analog and digital demodulators. The inventive system in a first aspect is covered in the prior application and incorporates an RF relay to switch the IF signal between the analog and digital demodulators and to couple the AGC signal back to the tuner. In another aspect of that invention, the switching is minimized by multiplexing the very low frequency AGC signal with the high frequency (45 MHz) IF signal. The multiplexing is accomplished by means of separate high frequency and low frequency paths between the tuner and the RF switch, between the RF switch and the analog demodulator and between the RF switch and the digital demodulator.

The present invention precludes the possibility of interference being generated by interaction of the oscillators in the demodulators, both of which are active. It also permits use with equipment from different manufacturers that may operate at different voltage levels.

OBJECTS OF THE INVENTION

A principal; object of the invention is to provide an improved low cost method of processing digital and analog television signals using a single tuner.

Another object of the invention is to provide a single-tuner television receiver that operates to receive analog and digital signals with minimal oscillator interference.

BRIEF DESCRIPTION OF THE DRAWINGS

These and other objects and advantages of the invention will be apparent upon reading the following description in conjunction with the drawings in which.

DESCRIPTION OF THE PREFERRED EMBODIMENTS

Figure 1:
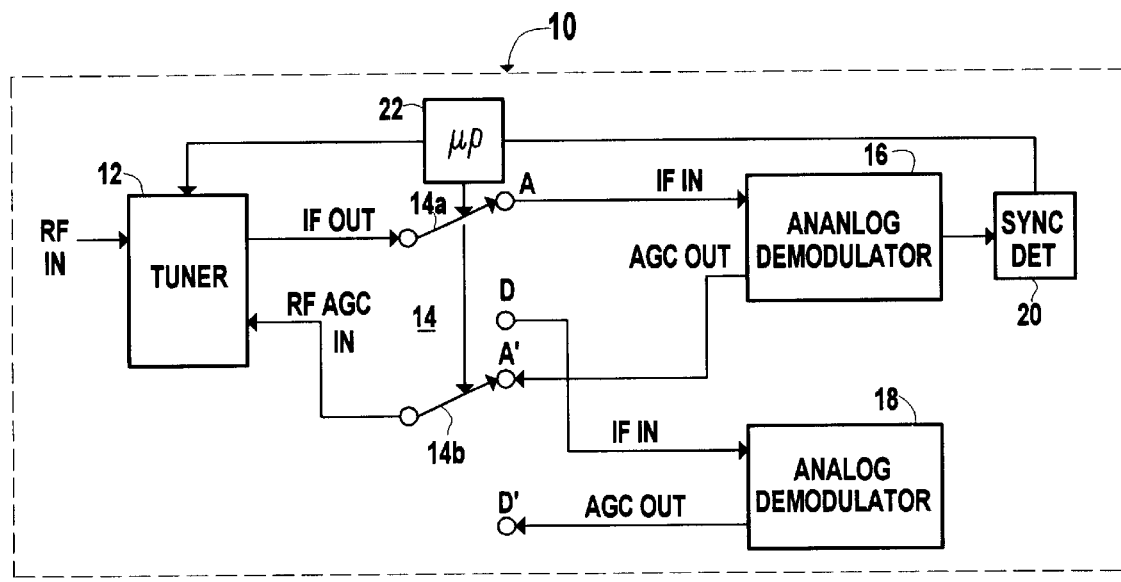
FIG. 1 is a partial block diagram of a television receiver constructed in accordance with a first aspect of the invention claimed in the prior application.

As discussed above, the circuits of FIGS. 1 and 2 relate to the inventions in the above-identified prior copending application. Referring to FIG. 1 of the drawings, a dashed-line block 10 indicates a television receiver that includes a tuner 12 that is capable of receiving both analog and digital television signals and converting them to an IF signal. (It will be appreciated that either a single conversion or a double conversion tuner may be used, the present preference being for a double conversion tuner). The IF signal is supplied to a first pole 14a of a two-pole RF switch 14 that is selected for its low noise and loss characteristics for RF signals. Pole 14a is selectively connectable to a pair of terminals A and D, with terminal A being coupled to an analog demodulator 16 and terminal D being coupled to a digital demodulator 18. Switch 14 has a second pole 14b that is selectively connectable between a pair of terminals A' and D'. Analog demodulator 16 supplies a sync separator 20, of conventional design, for separating the sync signals in the demodulated analog signal. Sync separator 20 is connected to a microprocessor 22 that controls tuner 12 and the operation of switch 14. Specifically, in the presence of syncs corresponding to a demodulated analog type signal, microprocessor 22 causes switch 14 to connect its pole 14a to terminal A which routes the IF signal from tuner 12 to analog demodulator 16. In the absence of syncs corresponding to a demodulated analog type signal, microprocessor causes switch 14 to connect its pole 14a to terminal D to couple the IF signal to digital demodulator 18.

The demodulators selectively develop an AGC signal, in response to the received IF signal, for controlling the gain of the tuner. The developed AGC signal from analog demodulator 16 is coupled to terminal A' of switch 14 and the AGC signal from digital demodulator 18 is coupled to terminal D' of switch 14. When switch 14 is in its analog position, poles 14a and 14b couple the IF signal from tuner 12 to analog demodulator 16 and the AGC signal from analog demodulator 16 to tuner 12, respectively. Conversely, when switch 14 is in its digital position, the IF signal from tuner 12 is coupled to digital demodulator 18 via pole 14a and terminal D and the AGC signal is coupled back to tuner 12 from digital demodulator 18 via terminal D' and pole 14b.

Figure 2:
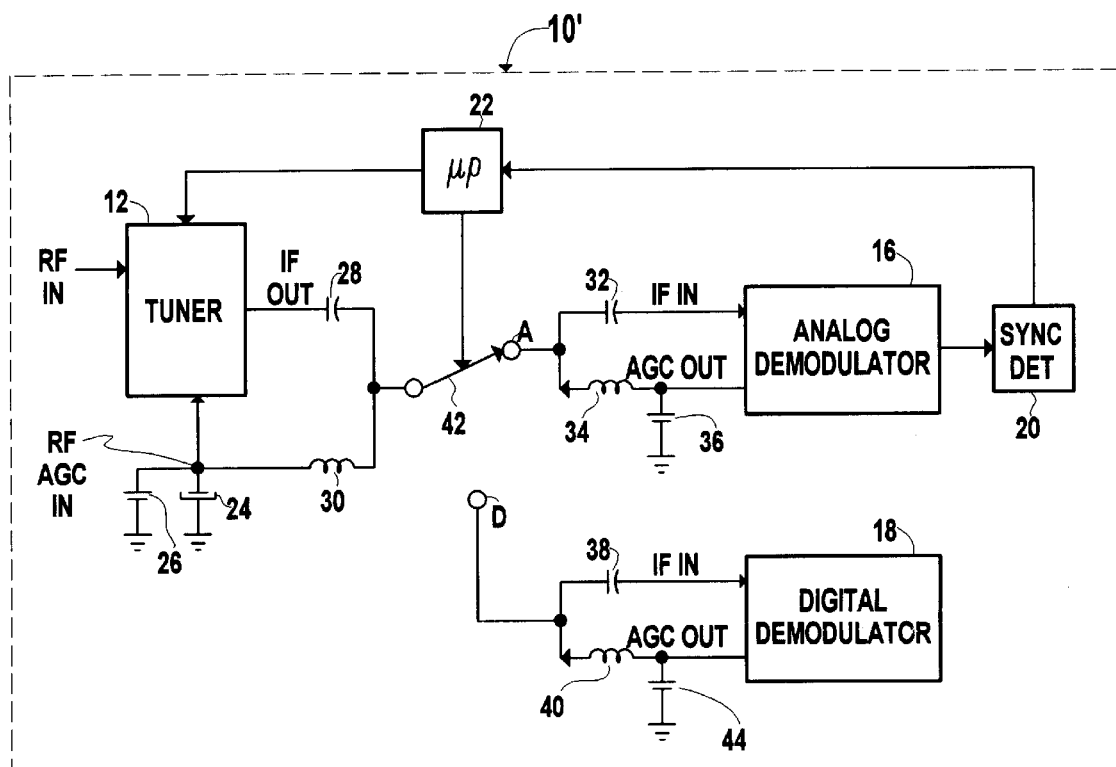
FIG. 2 is a partial block diagram of a television receiver constructed in accordance with a second aspect of the invention claimed in the prior application.

The embodiment of the invention in FIG. 2 discloses a television receiver 10' incorporating an RF switch 42 having a single pole that is movable between terminals A and D. Both the RF signal switching and the AGC signal switching are accomplished by switch 42. This is achieved by multiplexing the RF signal and the AGC signal and incorporating circuitry for discriminating between the signals based upon their difference in frequency. A small capacitor 28 couples the IF signal from tuner 12 to switch 42 and a coil 30 couples the AGC signal from switch 42 to tuner 12. The AGC signal is filtered by a filter capacitor 24 that is bypassed to ground by a small capacitor 26. Terminal A of switch 42 is coupled through a small capacitor 32 to analog demodulator 16 for supplying the IF signal, and is supplied with the AGC signal from analog demodulator 16 through a coil 34, the input side of which is bypassed to ground via a small capacitor 36. Similarly, terminal D of switch 42 couples the IF signal to digital demodulator 18 by means of a small capacitor 38 and receives the AGC output of digital demodulator 18 through a coil 40, the input side of which is bypassed to ground through a small capacitor 44.

As in the FIG. 1 embodiment, microprocessor 22 controls the operation of switch 42 in accordance with the type of signal (analog or digital) that is received. Specifically, the presence of syncs associated with a demodulated analog signal is communicated to the microprocessor. The IF signal (high frequency) paths are through capacitors 28, 32 and 38 and the AGC signal (low frequency) paths are through coils 30, 34 and 40. The bypass capacitors 26, 36 and 44 are provided to remove any high frequencies from the AGC signal. In the actual circuit, all capacitors are 0.001 microfarads and all coils are 10 microhenries in value.

Figure 3:
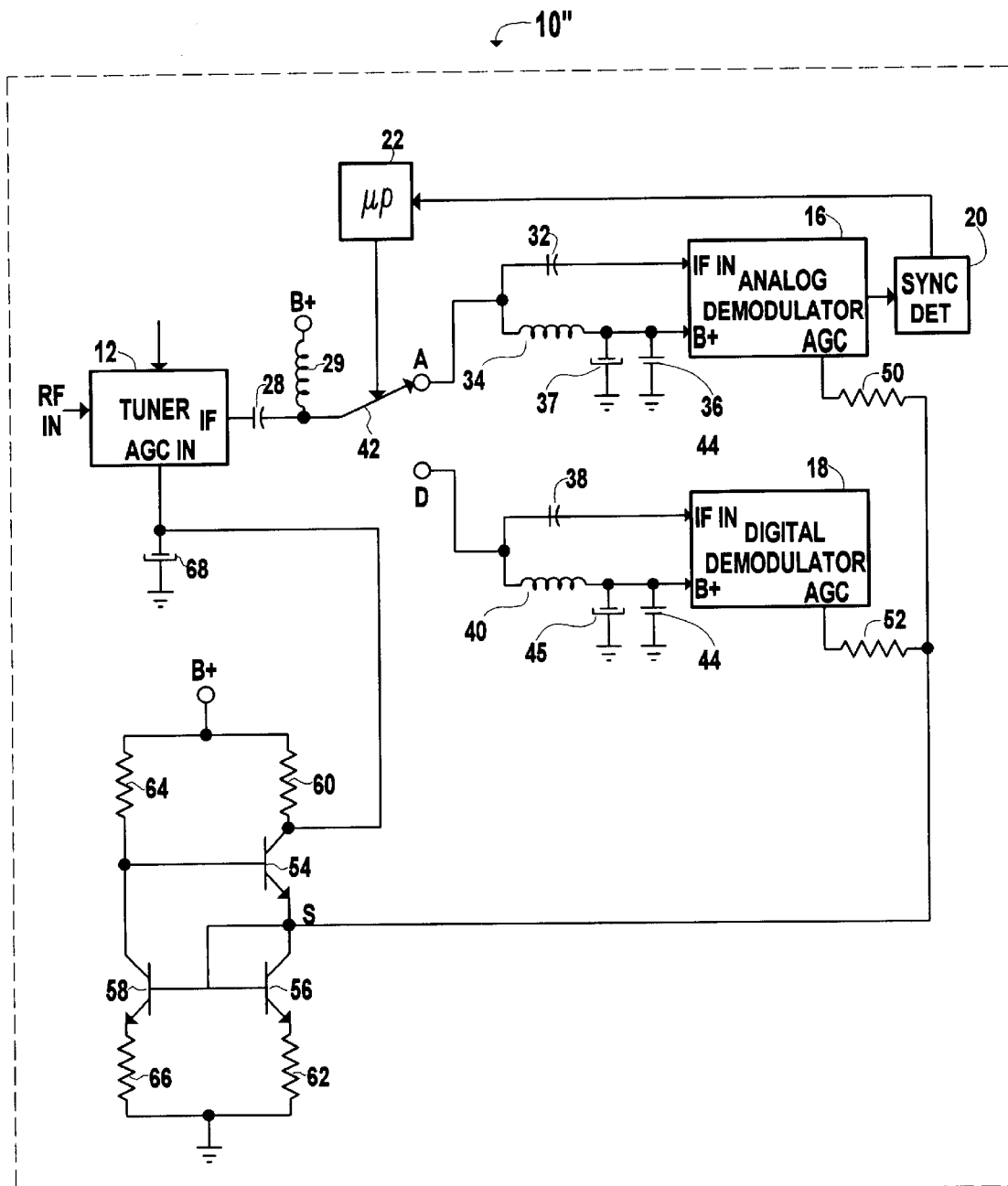
FIG. 3 is a partial block diagram of a television receiver constructed in accordance with the present invention.

Referring to FIG. 3, the circuit of the present invention will be described. A television receiver is indicated by the dashed line box 10" and includes many of the same elements as discussed in connection with FIG. 2, above, which elements are identified by the same reference numerals. The major differences between FIG. 3 and FIG. 2 is in switching of the B+ operating potential for analog demodulator 16 and digital demodulator 18, and the provision of a current mirror for coupling the AGC potentials from the demodulators to the tuner. The B+ is supplied through a coil 29 to switch 42, and is supplied to the B+ input of the corresponding demodulator depending upon whether switch 42 is in position A or position D. The DC supply voltage for analog demodulator 16 is conveyed through coil 34, with a filter capacitor 37 providing further filtering. Any high frequency signals on the B+ supply are diverted to ground through small capacitor 36. A similar operation obtains for digital demodulator 18 with a filter capacitor 45 corresponding to filter capacitor 37 and a small capacitor 44 corresponding to small capacitor 36. It will be observed that the non-selected one of the demodulators is therefore disabled as it receives no B+ operating potential Consequently, the oscillators (not shown) in the respective demodulators are never simultaneously active, which precludes their interfering with each other. (The oscillator in the analog demodulator runs at 45.75 MHz and the oscillator in the digital demodulator runs at 46.69 MHz, which could result in a beat frequency.)

The AGC potentials from the demodulators are supplied through resistors 50 and 52, respectively, to a node S of a current mirror. The current mirror includes transistors 54, 56 and 58 and resistors 60, 62, 64 and 66. The AGC voltage is supplied from the current mirror to the AGC input of tuner 12 and is filtered by a filter capacitor 68. The current mirror represents a unity gain non inverting amplifier with no appreciable DC level shift. The ratio of resistors 60 and 50 (or resistors 60 and 52) represents the gain of the amplifier. With resistors 60, 52 and 50 equal to each other, the gain is unity. It will be appreciated that changing the values of these resistors relative to each other enables great flexibility in selecting the resultant AGC voltage and the input AGC voltages to meet different circuit requirements. Also, the provision of the current mirror prevents loading of the active AGC circuit by the inactive one and therefore maintains the AGC range. Node S represents a virtual ground because of the feedback mechanism of the three transistor current mirror. The minimum AGC output voltage for the arrangement is approximately 0.8 volts, which for most tuners is below the minimum requirement.

The active AGC can take on a value from zero volts to its maximum, which for the described circuit is about 5.0 volts. The disabled AGC is near zero volts. As the AGC voltage increases, the current through corresponding resistor 50, 52 and node S increases. The current in the current mirror (consisting of transistors 56 and 58) remains constant because it is specified by the current in resistor 64. Therefore the current in the emitter of transistor 54 is forced to be the difference between the current mirrored through resistor 64 and the current added to node S by the corresponding AGC voltage and the corresponding one of resistors 50, 52. The collector current of transistor 54 is equal to its emitter current and therefore the difference current in the emitter of transistor 54 is also produced across collector resistor 60, which develops the AGC voltage for the tuner. The values of the coils and small capacitors are the same as in the FIG. 2 circuit. In addition, the filter capacitors are 10 microfarads, resistors 62 and 66 are each 100 ohms and resistors 50, 52, 60 and 64 are each 10,000 ohms.

What has been described is a novel television receiver that is capable of receiving both analog and digital signals. It is recognized that numerous changes to the described embodiment of the invention will be apparent without departing from its true spirit and scope. The invention is to be limited only as defined in the claims.

What is claimed is:

1. A method of operating a television receiver for receiving either analog or digital signals comprising:

providing an analog demodulator and a digital demodulator;

providing an RF switch for selectively switching a tuner signal between the analog demodulator and the digital demodulator;

supplying B+ operating potential through the RF switch for automatically enabling the selected one of the demodulators through the RF switch; and supplying an AGC signal from the enabled one of the demodulators to the tuner.

2. The method of claim 1, further comprising:

developing a control signal indicative of the type of tuner signal; and controlling the RF switch with the control signal.

3. The method of claim 2, further comprising:

supplying the AGC signal to the tuner through a current mirror.

4. A method of operating a television receiver for receiving either analog or digital signals comprising:

providing an analog demodulator and a digital demodulator;

providing an RF switch for selectively switching a tuner signal between the analog demodulator and the digital demodulator;

developing a control signal indicative of the type of tuner signal;

controlling the RF switch with the control signal, providing B+ operating potential through the RF switch for selectively enabling the demodulators through the RF switch, and supplying an AGC signal from the enabled one of the analog and digital demodulators to the tuner.

5. The method of claim 4, further comprising:

supplying the AGC signal to the tuner through a current mirror arrangement.

6. A television receiver for receiving either analog or digital signals comprising:

a tuner;

an analog demodulator and a digital demodulator;

an RF switch coupled between said timer and said demodulators for selectively coupling a tuner signal between said analog demodulator and said digital demodulator;

means for supplying B+ operating potential to said demodulators through said RF switch for automatically enabling the selected one of said demodulators through said RF switch; and means for supplying an AGC signal from the selected one of said analog and said digital demodulators to said tuner.

7. The receiver of claim 6, further comprising:

means for developing a control signal indicative of the type of said tuner signal; and means for controlling operation of said RF switch with said control signal.

8. The receiver of claim 7, further comprising:

a current mirror; and means for connecting said current mirror for coupling said AGC signal to said tuner.

9. A television receiver for receiving either analog or digital signals comprising:

a tuner;

an analog demodulator and a digital demodulator;

an RF switch coupled between said tuner and said demodulators for selectively coupling a tuner signal between said analog demodulator and said digital demodulator;

means for developing a control signal indicative of the type of said tuner signal;

means for controlling operation of said RF switch with said control signal;

means for supplying operating potential to said demodulators through said RF switch; and a current mirror; and means for supplying an AGC signal from the selected one of said analog and said digital demodulators to said tuner through said current mirror.

* * * * *